May 31, 1966     KYOUNG TAIK CHOUGH     3,253,466
THERMOMETER DEVICE
Filed March 28, 1963
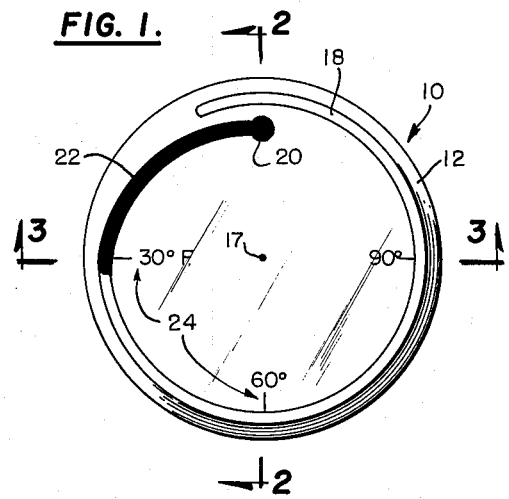
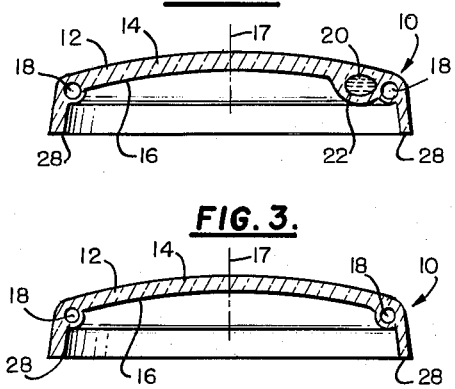
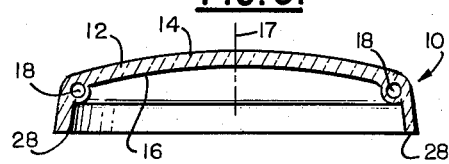
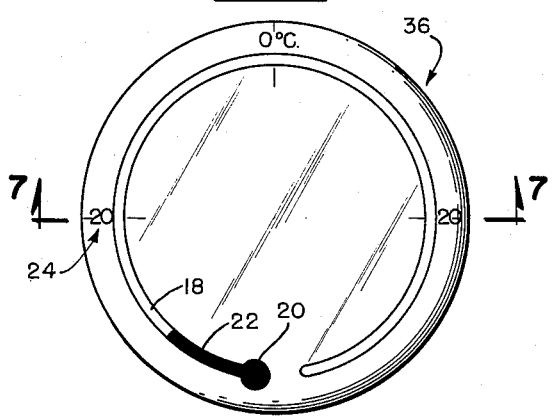
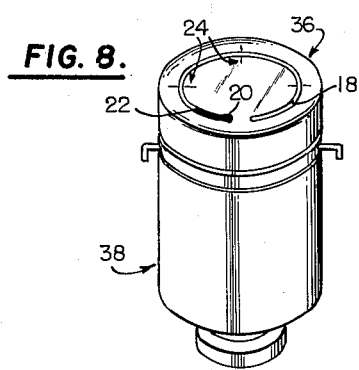
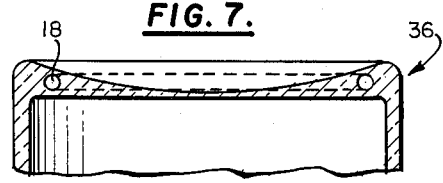
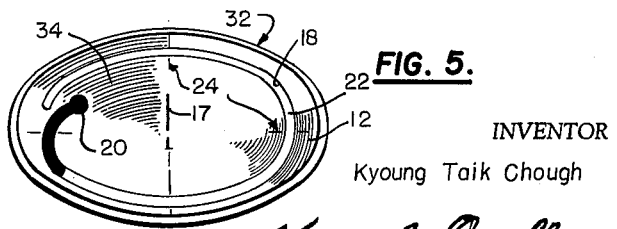
INVENTOR
Kyoung Taik Chough
BY Kimmel & Crowell
ATTORNEYS

United States Patent Office 3,253,466
Patented May 31, 1966

3,253,466
THERMOMETER DEVICE
Kyoung Taik Chough, 81 1st St., Chung-Pa Dong,
Yongsan-ku, Seoul, Korea
Filed Mar. 28, 1963, Ser. No. 268,804
4 Claims. (Cl. 73—343)

This invention relates to a thermometer device and relates more particularly to an element formed of a material having a high coefficient of thermal conductivity wherein the element has formed integrally therewithin a means to indicate the temperature thereof.

A primary object of the instant invention is to provide a thermometer device wherein an elongated bore of substantially constant cross-section and having a bulbous cavity defined at one end is formed within a substantially concavo-convex element and a fluid material having a high coefficient of thermal expansion is contained within said cavity and bore for indicating the temperature of the device.

Another object of the instant invention is the provision of a device of the character described wherein the elongated bore is arcuate or helical and is defined adjacent to and substantially parallel with the peripheral edge of the element.

A further object of this invention is to provide a thermometer device particularly for use with a laboratory watchglass to facilitate determining the temperature of the sample of material supported by the watchglass.

A still further object of this invention is the provision of a crystal for a watch such as a wristwatch or the like having incorporated therein means to indicate the temperature of the surrounding atmosphere as well as the time.

Another object of the instant invention is to provide a thermometer device integrally formed within a portion of a container so that one may quickly determine the temperature of the contents therewithin.

Other and further objects reside in the combination of elements, arrangement of parts, and features of construction.

Still other objects will in part be obvious and in part be pointed out as the description of the invention proceeds and as shown in the accompanying drawing wherein:

FIGURE 1 is a top plan view of a thermometer device in accordance with the instant invention;

FIGURE 2 is a transverse cross-sectional view through the device of FIGURE 1 taken substantially on line 2–2 of FIGURE 1;

FIGURE 3 is a transverse cross-sectional view taken at right angles to the section in FIGURE 2 substantially on line 3–3 of FIGURE 1;

FIGURE 4 is a fragmentary top plan view to a smaller scale of a thermometer device in accordance with the instant invention incorporated into the crystal of a wristwatch;

FIGURE 5 is a perspective view to a smaller scale of a laboratory watchglass having incorporated therein a thermometer device in accordance with the instant inventive concept;

FIGURE 6 is a top plan view of the base portion of a bottle having integrally formed therein a thermometer device in accordance with this invention;

FIGURE 7 is a fragmentary transverse cross-sectional view of the base portion of a bottle taken substantially on line 7–7 of FIGURE 6; and FIGURE 8 is a perspective view to a smaller scale of a bottle having a thermometer device integrally formed in its base portion to facilitate determining the temperature of the material contained therewithin.

Like reference characters refer to like parts throughout the several views of the drawing.

Referring now to the drawing in general and more particularly to FIGURES 1–3, a thermometer device in accordance with the instant inventive concept is designated generally by the reference numeral 10 and will be seen to comprise basically a curved element 12 formed of a material having a high coefficient of thermal conductivity, such as glass or the like. The embodiment of FIGURES 1–3 is substantially concavo-convex having one substantially convex surface 14 opposed by a substantially concave surface 16 having a central perpendicular axis 17 about which surfaces 14, 16 are symmetrical. Integrally defined between the surfaces 14 and 16, respectively, is an elongated bore 18, arcuate in form and shown as helical in the embodiment of FIGURES 1–3. The elongated bore 18 is substantially of constant cross-section throughout and has defined at one end thereof an enlarged bulbous cavity 20 communicating therewith. A quantity of fluid material 22 having a relatively high coefficient of thermal expansion such as mercury, colored alcohol or the like is contained within the bulbous cavity 20 and partially fills the elongated bore 18, the portion of the bore 18 filled with the fluid material 22 being directly proportional to the temperature to which the fluid material is subjected. Graduations 24 are defined on the surface of the element 12 and are correlated with the particular fluid material 22 contained within the bulbous cavity 20 and elongated bore 18 to indicate the temperature in a well-known manner.

The thermometer device shown in FIGURES 1–3 may be utilized as a crystal for a watch such as the wristwatch 26 indicated generally in FIGURE 4 and the elongated bore 18 is defined adjacent to, and substantially parallel with, the peripheral edge 28 of the element 12 so that the face of the watch indicated generally at 30 may be viewed simultaneously with the thermometer device allowing a laboratory technician or the like to simultaneously determine the time and the ambient temperature. The peripheral edge 28 may have any conventional means (not shown) formed integral therewith to facilitate securing the element 12 to the watch 26.

A similar device is shown in FIGURE 5 generally at 32 for use particularly as a laboratory watchglass. In the embodiment of FIGURE 5, the concave or upper surface 34 is substantially smooth, it being understood that either or both surfaces 14 and 16, respectively, can be formed relatively smooth depending upon the particular utility of the thermometer device. The high thermal conductivity of the element 12 when used as a watchglass will quickly and accurately render the temperature indicated by the fluid material 22 within bore 18 the same as the sample (not shown) supported in the center of the concave portion thereof. It will be seen, therefore, that watchglass 32 acts as a container. Because of the concavity of watchglass 32 as well as glass 10 and the helical nature of bore 18, it will be apparent that the radius of curvature of bore 18 increases away from cavity 20 with each increment of bore 18 away from cavity 20 being vertically spaced further from cavity 20 than the preceding increment. Such a geometric figure may be entitled a conico-helix or may be stated to be conico-helical in configuration.

The same inventive concept is shown in FIGURES 6–8 as incorporated into the base portion 36 of a container such as a blood plasma bottle 38. In ordinary use such a bottle is positioned with its base portion 36 visually observable as shown in FIGURE 8 so that a nurse or the like can quickly determine the exact temperature of the material contained within the bottle 38. The elongated bore 18 shown in the embodiment of FIG- URES 6–8 is substantially circular, it being understood that the same may be easily modified to be helical and that the helix may include as many loops as necessary to provide for an accurate determination of the temperature. It is also to be understood that the graduations 24 may be either centigrade or Fahrenheit, and the range of temperatures will vary with the atmosphere in which the thermometer device is to be utilized. For example, the graduations used in the wristwatch embodiment of FIGURE 4 range from 30° to 90° F. whereas the graduations on the plasma bottle 38 range from —20° to +20° C.

It will now be seen that there is herein provided a thermometer device which satisfies all of the objectives of the instant invention and others, including many advantage of great practical utility and commercial importance.

Since many embodiments may be made of the instant inventive concept and since many modifications may be made of the embodiments hereinbefore shown and described, it is to be understood that all matter herein is to be interpreted merely as illustrative and not in a limiting sense.

I claim:
1. In combination,
   a transparent body portion forming a bottle including side walls and a bottom wall having an inner and outer surface, said bottom wall being free from obstructions in a direction away from said side walls; and
   a temperature measuring element including an elongate arcuate bore of substantially constant cross-sectional area formed in said bottom wall, a bulbous cavity positioned at one end of said bore in fluid communication therewith and a quantity of fluid material having a high coefficient of thermal expansion filling said bulbous cavity and partially filling said elongated arcuate bore, said body carrying a plurality of indicia spaced along and adjacent said arcuate bore providing means for reading the temperature of said body.

2. The structure of claim 1 wherein one of said bottom wall surfaces is curved.

3. In combination,
   a transparent body portion having a substantially convex surface, a substantially concave surface juxtaposed to said convex surface, and a peripheral edge disposed away from said surfaces; and
   a temperature measuring element including an elongate arcuate bore of substantially constant cross-sectional area formed in said body portion between said surfaces, a bulbous cavity positioned at one end of said elongated bore in fluid communication therewith and a quantity of fluid material having a high coefficient of thermal expansion filling said bulbous cavity and partially filling said elongated arcuate bore, said body carrying a plurality of indicia spaced along and adjacent said arcuate bore providing means for reading the temperature of said body, said concave surface forming the bottom of a container, said container being free of obstructions below said convex surface and vertically above said concave surface whereby said bore is visible from above or below said container.

4. In combination,
   a transparent body portion having a substantially convex surface, a substantially concave surface juxtaposed to said convex surface, and a peripheral edge disposed away from said surfaces; and
   a temperature measuring element including an elongate arcuate bore of substantially constant cross-sectional area formed in said body portion between said surfaces, a bulbous cavity positioned at one end of said elongated bore in fluid communication therewith and a quantity of fluid material having a high coefficient of thermal expansion filling said bulbous cavity and partially filling said elongated arcuate bore, said body carrying a plurality of indicia spaced along and adjacent said arcuate bore providing means for reading the temperature of said body, said elongate bore being positioned adjacent and substantially parallel to said peripheral edge, and forming a helix, said surfaces having a central perpendicular axis, said surfaces being symmetrical with respect to said axis, said helix being substantially conico-helical in configuration, said concave surface forming the bottom of a container, said container being free of obstructions below said convex surface and vertically above said concave surface whereby said bore is visible from above or below said container.

References Cited by the Examiner
UNITED STATES PATENTS

| | | | |
|---|---|---|---|
| 2,035,334 | 3/1936 | Monrad | 73—371 |
| 2,319,101 | 5/1943 | Anderson | 73—343.2 |
| 2,463,510 | 3/1949 | Brasefield | 73—374 |
| 3,135,118 | 6/1964 | Zlobin | 73—343.2 |
| 3,177,718 | 4/1965 | Stevenson | 73—344 |

FOREIGN PATENTS

| | | |
|---|---|---|
| 1,130,467 | 3/1955 | France. |
| 22,926 of 1902 | 7/1903 | Great Britain. |

LOUIS R. PRINCE, *Primary Examiner.*
ISAAC LISANN, DAVID SCHONBERG, *Examiners.*
JAMES RENJILIAN, *Assistant Examiner.*